United States Patent
Savvides et al.

(10) Patent No.: US 12,217,339 B2
(45) Date of Patent: Feb. 4, 2025

(54) MULTIPLE HYPOTHESIS TRANSFORMATION MATCHING FOR ROBUST VERIFICATION OF OBJECT IDENTIFICATION

(71) Applicant: CARNEGIE MELLON UNIVERSITY, Pittsburgh, PA (US)

(72) Inventors: Marios Savvides, Pittsburgh, PA (US); Uzair Ahmed, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 18/272,298

(22) PCT Filed: Mar. 31, 2022

(86) PCT No.: PCT/US2022/022709
§ 371 (c)(1),
(2) Date: Jul. 13, 2023

(87) PCT Pub. No.: WO2022/212618
PCT Pub. Date: Oct. 6, 2022

(65) Prior Publication Data
US 2024/0104893 A1    Mar. 28, 2024

Related U.S. Application Data

(60) Provisional application No. 63/170,230, filed on Apr. 2, 2021.

(51) Int. Cl.
*G06V 10/00*    (2022.01)
*G06T 3/60*    (2006.01)
(Continued)

(52) U.S. Cl.
CPC .............. *G06T 11/60* (2013.01); *G06T 3/60* (2013.01); *G06T 17/00* (2013.01); *G06T 19/20* (2013.01);
(Continued)

(58) Field of Classification Search
CPC .......... G06N 3/08; G06N 3/042; G06N 3/045; G06N 3/047; G06N 3/0454; G06N 3/0457;
(Continued)

(56) References Cited

U.S. PATENT DOCUMENTS 5,251,131 A     10/1993  Masand
8,379,940 B2 *  2/2013   Wechsler .............. G06F 18/211
                                                    382/118

(Continued)

OTHER PUBLICATIONS

Li et al., "DeepIM: Deep Iterative Matching for 6D Pose Estimation" Proceedings of the European Conference on Computer Vision (ECCV), 2018, pp. 683-698.
(Continued)

*Primary Examiner* — Amir Alavi
(74) *Attorney, Agent, or Firm* — KDW Firm PLLC

(57) ABSTRACT

A method for increasing the confidence of a match between a test image and an image stored in a library database in which features are extracted from the test image and compared to features stored in the image database. If a match is determined, one or more transformations are performed on the test image to generate pose-altered images from which features are extracted and matched with pose-altered images in the database. The scores for the subsequent matchings can be aggregated to determine an overall probability of a match between the test image in an image in the library database.

20 Claims, 10 Drawing Sheets

(51) Int. Cl.
*G06T 11/60* (2006.01)
*G06T 17/00* (2006.01)
*G06T 19/20* (2011.01)
*G06V 10/24* (2022.01)
*G06V 10/25* (2022.01)
*G06V 10/44* (2022.01)
*G06V 10/56* (2022.01)
*G06V 10/74* (2022.01)
*G06V 10/764* (2022.01)
*G06V 10/82* (2022.01)
*G06V 20/50* (2022.01)
*G06V 20/68* (2022.01)

(52) U.S. Cl.
CPC ............ *G06V 10/245* (2022.01); *G06V 10/25* (2022.01); *G06V 10/44* (2022.01); *G06V 10/56* (2022.01); *G06V 10/761* (2022.01); *G06V 10/764* (2022.01); *G06V 10/82* (2022.01); *G06V 20/50* (2022.01); *G06V 20/68* (2022.01); *G06T 2219/2016* (2013.01)

(58) Field of Classification Search
CPC ........ G06N 3/082; G06N 3/092; G06T 11/60; G06T 3/60; G06T 17/00; G06T 19/20; G06T 2219/2016; G06V 10/25; G06V 10/56; G06V 10/761; G06V 10/82; G06V 10/44; G06V 10/774; G06V 10/776; G06V 10/764; G06V 10/245; G06V 20/68; G06V 20/50; G06Q 10/08
See application file for complete search history.

(56) References Cited

U.S. PATENT DOCUMENTS

| | | | | |
|---|---|---|---|---|
| 8,929,602 | B2* | 1/2015 | Ding | G06T 7/70 |
| | | | | 382/103 |
| 9,154,773 | B2* | 10/2015 | Ding | G06T 7/593 |
| 9,436,987 | B2* | 9/2016 | Ding | G06T 7/11 |
| 10,054,445 | B2* | 8/2018 | Ma | G06F 18/2411 |
| 10,109,055 | B2* | 10/2018 | Xu | H04N 13/239 |
| 10,467,498 | B2* | 11/2019 | Lee | H04N 23/64 |
| 11,915,463 | B2* | 2/2024 | Savvides | G06V 20/52 |
| 12,067,527 | B2* | 8/2024 | Savvides | G06F 16/5846 |
| 2006/0018521 | A1 | 1/2006 | Avidan | |
| 2010/0092093 | A1 | 4/2010 | Akatsuka | |
| 2010/0111370 | A1 | 5/2010 | Black | |
| 2012/0114175 | A1 | 5/2012 | Hwang | |
| 2014/0105506 | A1 | 4/2014 | Drost | |
| 2021/0183097 | A1* | 6/2021 | Georgakis | G06V 20/653 |
| 2022/0398775 | A1* | 12/2022 | Streem | G06T 17/05 |
| 2024/0104893 | A1* | 3/2024 | Savvides | G06V 10/82 |

OTHER PUBLICATIONS

Collet et al., "TheMOPEDframework: Object Recognition and Pose Estimation for Manipulation" The International Journal of Robotics Research, Apr. 2011.
D. G. Lowe, "Object recognition from local scale-invariant features," Proceedings of the Seventh IEEE International Conference on Computer Vision, Kerkyra, Greece, 1999, pp. 1150-1157 vol. 2.
International Search Report and Written Opinion for the International Application No. PCT/US2022/022709, mailed Jun. 15, 2022, 22 pages.

* cited by examiner

MULTIPLE HYPOTHESIS TRANSFORMATION MATCHING FOR ROBUST VERIFICATION OF OBJECT IDENTIFICATION

RELATED APPLICATIONS

This application claims the benefit of U.S. Provisional Patent Application No. 63/170,230, filed Apr. 2, 2021, the contents of which are incorporated herein in their entirety.

BACKGROUND

In a retail setting, it is desirable to be able to use computer vision methods to detect and identify products on a retail shelf to aid in management of the retail establishment. For example, computer vision may be used to detect and identify products for various tasks, such as tracking product inventory, determining out-of-stock products and determining misplaced products. Product detection is one of the fastest-moving areas and plays a fundamental role in many retail applications such as product recognition, planogram compliance, out-of-stock management, and check-out free shopping.

To this end, numerous computer vision methods have been developed and many real-world applications based on those computer vision methods perform at a satisfactory level. Currently, various visual sensors (e.g., fixed cameras, robots, drones, and mobile phones) have been deployed in retail stores, enabling the application of advanced technologies to ease shopping and store management tasks.

Feature extractors typically extract features that are used in downstream tasks, such as classification. However, products can be of arbitrary poses in a real-world retail scene, especially when the image is taken by a camera not facing straight towards the shelf. For example, images could show products at arbitrary angles, rotated, crumpled (e.g., in the case of products packaged in bags, such as potato chips), color jittered, over-exposed, under-exposed, etc. Because of these difficulties, features extracted from images collected in a retail setting may not be able to be matched to features extracted from a pristine image of the product, such as an image of the product provided by the manufacturer. Therefore, the features extracted from these images may not be accurate for the downstream tasks.

SUMMARY

For building a system that is robust for product views, a conventional strategy is to train the artificial intelligence models based on the downstream task with overly sufficient data spanning across the different views of the objects. Collecting and accumulating qualified and representative datasets is not easy in the real world due to various time, labor and financial constraints. Data becomes the real bottleneck in the learning capacity of many of the machine learning and artificial intelligence models.

Described herein is a system and method for data augmentation strategies to generate machine learning training data that is crucial in training efficient models when the supply of training data is limited.

The disclosed system and method uses a neural network to learn the feature embeddings of objects in different object pose views (2D rotation, 3D rotation, light, resolution, etc.) to learn pose-invariant feature embeddings, neural representations that are invariant to both the 2D and 3D orientation of an object. The method trains the neural network using data augmented by a plurality of 2D views of the product.

In one embodiment, the plurality of 2D views are generated by first generating a 3D model of the product from a 2D image of the product, and then generating novel, synthetic 2D images of how the product looks at varying poses. Preferably, the 2D image from which the synthetic, pose-altered images are generated is a pristine image of the product supplied by the manufacturer, but any image may be used. In other embodiments, different methods of generating the synthetic, pose-altered 2D views are disclosed.

In a second aspect of the invention, features extracted from the varying views are enrolled in a database and used for product classification and, in a third embodiment, images of an unknown testing product are matched against a library database to attempt identification of the unknown product.

BRIEF DESCRIPTION OF THE DRAWINGS

By way of example, a specific exemplary embodiment of the disclosed system and method will now be described, with reference to the accompanying drawings, in which.

DETAILED DESCRIPTION

In the retail industry, new products are manufactured and brought to market on a regular basis. Additionally, existing products are always subject to a change in their packaging due to new designs or seasonal packaging throughout the year. To maintain a current library of products, it is important to be able to enroll and re-enroll product images in a timely manner.

To create an over-complete library of products with different variations in pose, the disclosed system and method first creates multiple 2D pose-altered images of the product. In a preferred embodiment, the multiple 2D pose-altered images are created by first creating a 3D model of the product from a high resolution 2D product image, which is often supplied by the manufacturer of the product. The 3D models can then be rotated along different axes, thereby providing access to different views of the same product from different view-points. Other method of generating the 2D pose-altered images of the product are also disclosed herein The method then extracts features from the generated pose-altered product images and adds these features to a library. This reduces the domain gap between the images in the library and the product images coming from store cameras, thus making the matching process invariant to the pose of the product to be identified. This results in a robust matching algorithm to recognize the product.

This approach creates a library of features representing products from different viewpoints. Each of the pose-altered images (as well as the original image of the product) are then passed through a feature extractor to obtain features of the images, which are then stored in a library database.

To train the feature extraction method for classification with a limited dataset access of products at different angles, the invention employs a training method that uses generation of 3D models of products from 2D images. These 3D models can be used to synthesize novel 2D images of the product from various viewpoints that can be used as a training dataset for building a classifier or a feature representation/extraction method (e.g., a feature extractor). The described method is key to building any type of pose-tolerant feature extraction method.

In one embodiment, to build a robust feature extractor for product identification regardless of data type, a self-supervised method is applied to augment the database for training. The method is a mixture of data augmentation strategies and multiple loss functions. A major performance improvement is achieved in comparison to traditional classification methods.

The method is independent of model architecture and other existing components for classification tasks.

Figure 1:
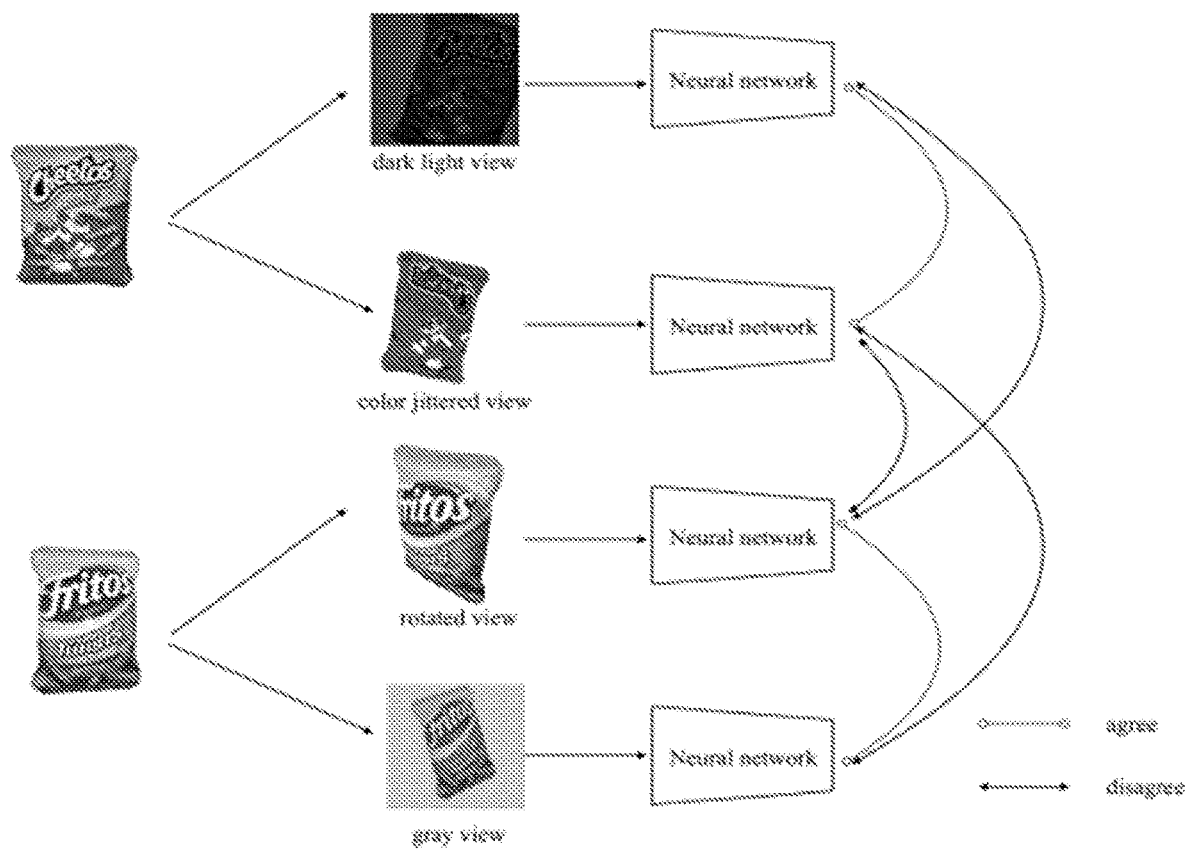
FIG. 1 is an illustration showing training of a feature extractor using augmented views as disclosed herein.

To achieve this, the method specifies a metric learning that maximizes the agreement/similarity between augmented images of the same product and minimizes that between different products in the feature space. After a good feature extractor is learned, many downstream tasks can be greatly improved using features extracted from the products, as shown in FIG. 1. In addition, ring loss, as described in U.S. Published Patent Application No. 2021/0034984, may be applied along with self-supervised learning to improve the model's capability to do classification for associated tasks.

For product identification, there is typically an onboarding product approach. One such product identification generates a 3D model. The method and process of feature extraction using 3D models can be applied for enrolling an image to onboard a new product using a 3D model generated from 2D images or other descriptions of the product with or without pose variations.

Several aspects of the invention specify different ways to generate the 3D model or to otherwise generate augmented 2D images of the product having alternate poses.

Figure 2:
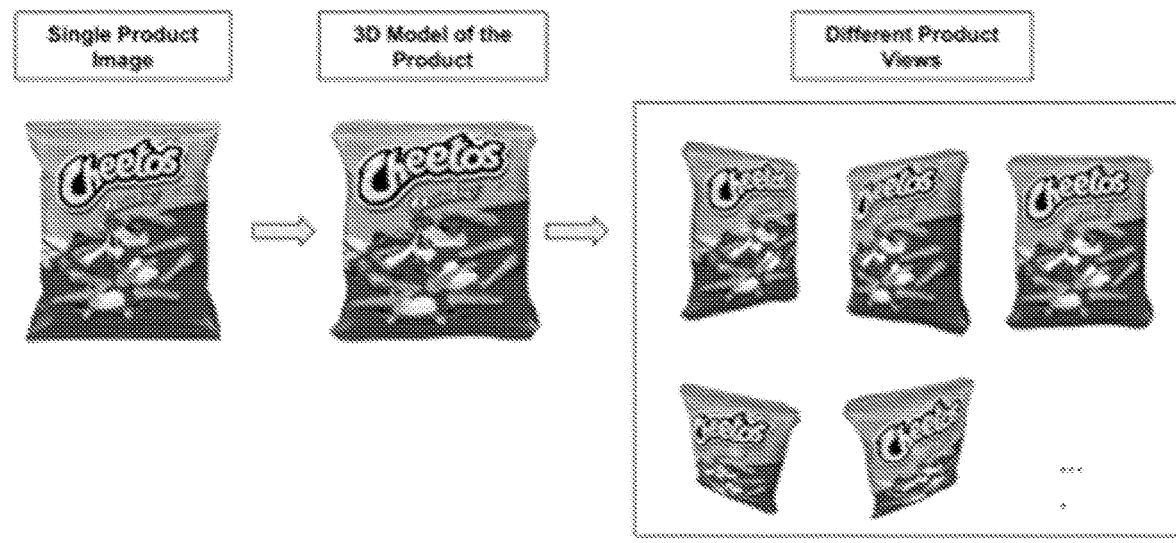
FIG. 2 is an illustration of a first aspect of the invention for generating the augmented views from a single image of the product.

In a first aspect of the invention, shown in FIG. 2, product views are generated using 3D model generation. In this approach, novel product views are generating a 3D model of the product, perturbing the 3D model in a plurality of different ways and capturing 2D views from the perturbations of the 3D model. The 3D model can be perturbed by rotation of the product along any or all of the 3 axes for any combination of degrees of rotation, thus generating product views from different viewpoints.

Figure 3:
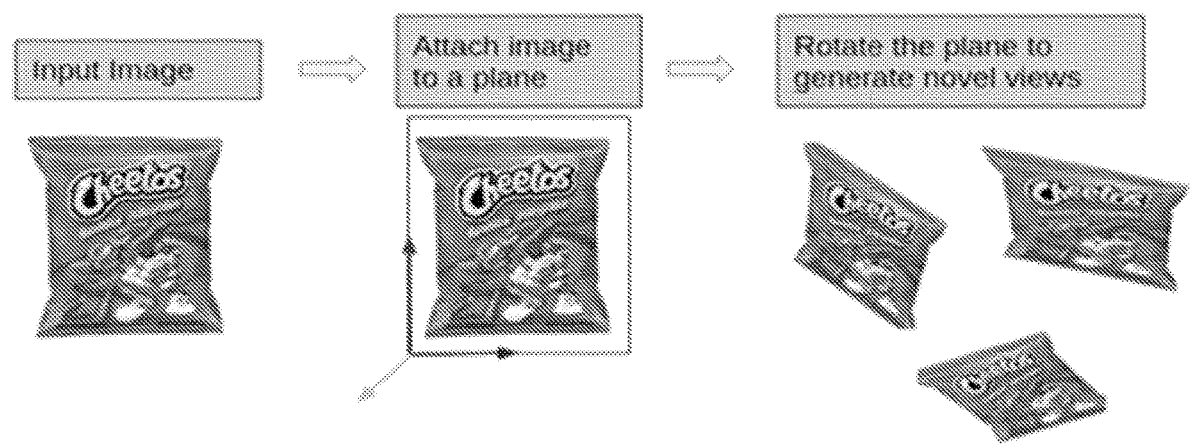
FIG. 3 is an illustration of a second aspect of the invention for generating the augmented views from a single image of the product.

In a second aspect of the invention, shown in FIG. 3, product views are generated using a 3D planar warp. In this method, explicit creation of the 3D model is avoided. The 2D image is fixed onto a plane with a known depth. Because the depth of the plane is known, the plane can be rotated along the 3 different axes to generate product images from different viewpoints.

Figure 4:
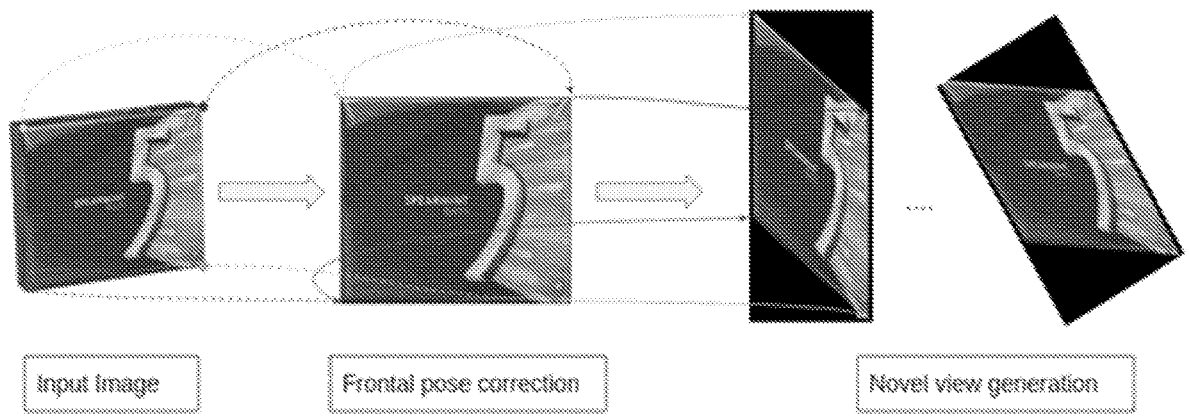
FIG. 4 is an illustration of a third aspect of the invention for generating the augmented views from a single image of the product.

In a third aspect of the invention, shown in FIG. 4, product views are generated by 2D projective transforms. Planar homography is a powerful tool that can be leveraged to fit images to arbitrary poses as long as all of the corresponding points maintain the same depth. In this approach, novel views are generated by fitting the corner endpoints of the image to different configurations, thus simulating different views. FIG. 4(a) shows an input image. In FIG. 4(b) the input image is pose-corrected to show only the front view, as described below. FIG. 4(c) shows transformation of the input image to the pose-corrected image by perturbation of the corner endpoints to new positions and rotation of the image to show a frontal view of the item.

Figure 5:
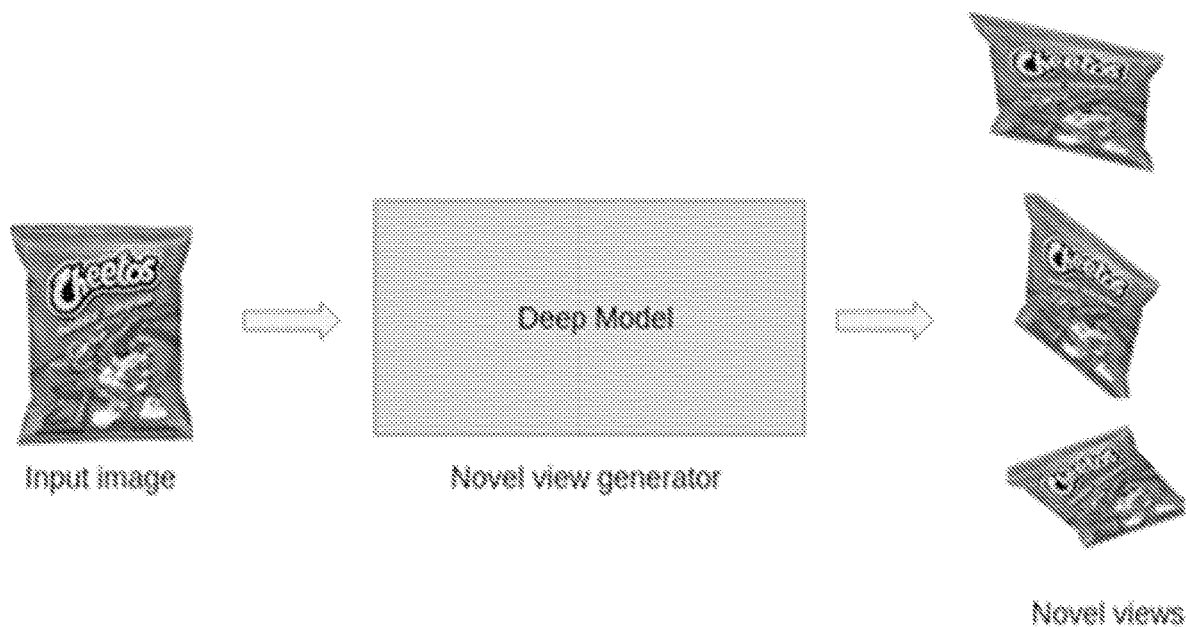
FIG. 5 is an illustration of a fourth aspect of the invention for generating the augmented views from a single image of the product.

In a fourth aspect of the invention, shown in FIG. 5, a machine learning-based data generation method is used. Generative modeling is a well-known technique in machine learning where a distribution of the input samples is learned from the labels, where sampling the distribution leads to the generation of novel data samples. Various methods include, but are not limited to, the use of autoencoders and adversarial learning based methods, spatial transformer networks where novel product views may be generated from various input reference images.

For any of the aspects of the invention for generation of the pose-altered views of the product, in the case wherein products have more than one side visible in the 2D image, for example, the product shown in FIG. 4(a), an additional optional step may be added to first pose-correct the image such that only the front facing side of the product is visible, as shown in FIG. 4(b). The frontal pose correction to get the front face of the product may or may not be done based on the application for which the data is being augmented.

As would be realized by one of skill in the art, any method of generating multi-pose images of an item from a single 2D image may be used to augment the training dataset, as well as to provide additional views for feature extraction, wherein the extracted features are enrolled in the library for later matching with features extracted from live images of the products.

Figure 6:
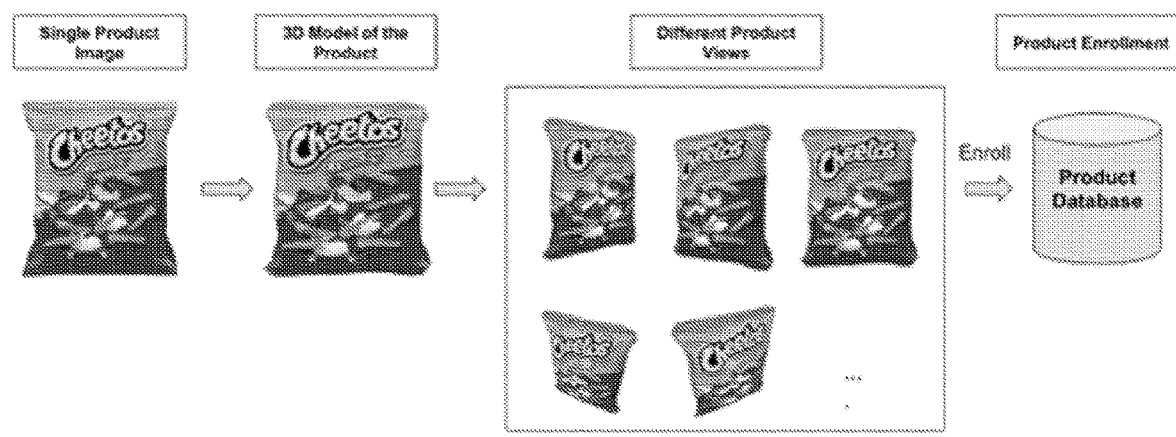
FIG. 6 is an illustration of the process of enrolling extracted feature in a product database library.

The synthesized, pose-altered, novel views of a product generated by data augmentation approaches such as any of the methods in the four aspects described herein, or by any other method, can be used for enrollment of the product in a product identification system, as shown in FIG. 6. Augmented image data can be used to extract features to be enrolled in a library database for further matching or training. The augmented image data can be sent to a database for 1:1 or 1:N verifications using an image classifier.

This method and process applies to any machine learning and artificial intelligence system using only a single reference image of a product by generating various product views for matching uses. That reference image can be a retail product image or a single captured image of a product from any capture source.

In some aspects of the invention, the features are extracted from all or partially synthesized or augmented views and are matched with features extracted from an image of an unknown testing product, which may have been captured, for example, by a robotic inventory system of a retail establishment. This matching provides a very efficient way to enroll products. It also provides the matching at any angle based on the reference image when only a single pose image of the product is available.

In another aspect of the invention, if more than one reference image is available, then more views can be generated and more image variations of the product become available for training, learning, and detection. For example, augmented 3D models may generate front and back views of a product for use by the learning and detection models. This provides the system a full view of the product. Thus, using the augmented 3D models of the products in an artificial intelligence model for object detection, or the techniques and approaches outlined above, the system generates multiple images from various viewpoints to simulate the camera settings and reduce the domain gap between the training and testing scenarios.

In an additional embodiment of the invention, an attempt may be made to match an original, un-altered test image with an object in the library database. The match is attempted in the manner previously described, by extracting features from the test image and matching the features to features stored in the library database. Features may be extracted from the test image using a feature extractor trained as described herein, or another type of feature extractor. The matching may be accomplished by a trained classifier.

However, as would be realized by one of skill in the art, the feature extraction method is not always robust or perfect, leading to images which are able to be matched based on features extracted from the original test image, even though the test image itself does not resemble the image in the library database with which it is matched.

To increase the confidence of the match, the test image can undergo one or more additional matching steps. To accomplish this, a set of transformations may be made to the unknown test image. The match scores are then computed between the features of the transformed unknown test image in the features of images stored in the library database. The resulting matching scores under various transformations are then fused in a linear or nonlinear manner and fed into a neural network trained to determine if the matched objects are the same based on the fused scores. The additional matching steps may increase the confidence that the original test image is a positive match for an image in the database.

In various embodiments, the transformations may be made using any of the methods of generating pose altered images disclosed herein, or by any other method. For example, simple rotations or translations of the original test image may be used. In cases where the library database contains both original images and generated pose-altered images, the pose alterations performed on the original test image are preferably the same as those performed to generate the pose-altered images stored in the library database. The generation of the post-altered images in the library database may be made at the time of the matching with the original test image or may be made beforehand and pre-stored in the library database.

Figure 7:
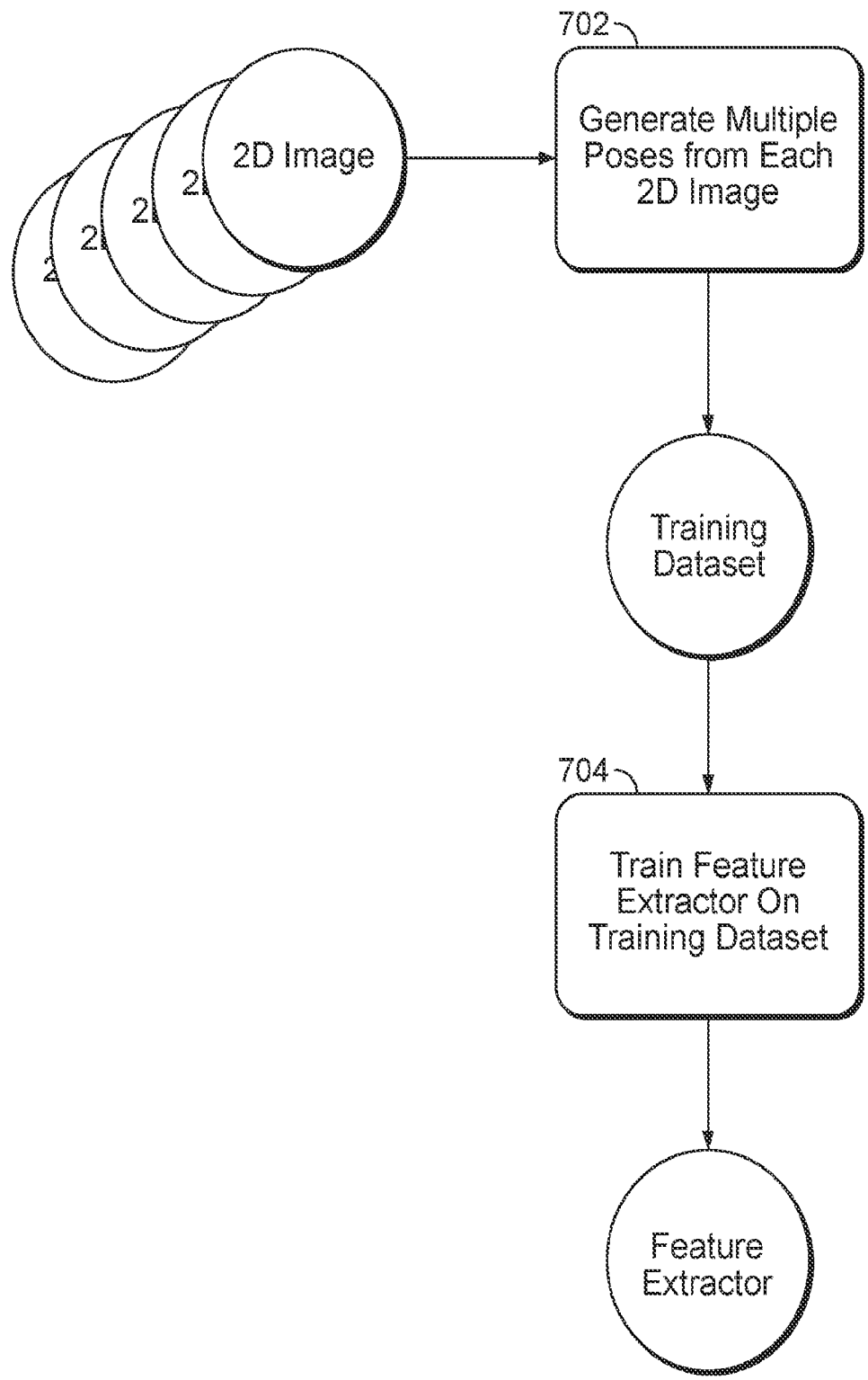
FIG. 7 is a flowchart depicting the training process of the feature extractor.

FIG. 7 is a flowchart showing the process of training the feature extractor. 2D images of various items are gathered and, at step 702, synthetic images showing multiple poses of the items in the 2D images are generated from each of the 2D images. In preferred embodiments of the invention one of the methods described herein for generating the synthetic, pose-altered images may be used. In alternate embodiments, any other method of generating the synthetic, pose-altered images may be used. The original 2D images, along with the synthetic pose-altered images comprise the training dataset for the feature extractor. At 704, the feature extractor is trained on the training dataset, resulting in a feature extractor trained to extract features from images showing multiple poses of a single item, which may be used for product enrollment or for product identification, as described with respect to FIG. 8 and FIG. 9.

Figure 8:
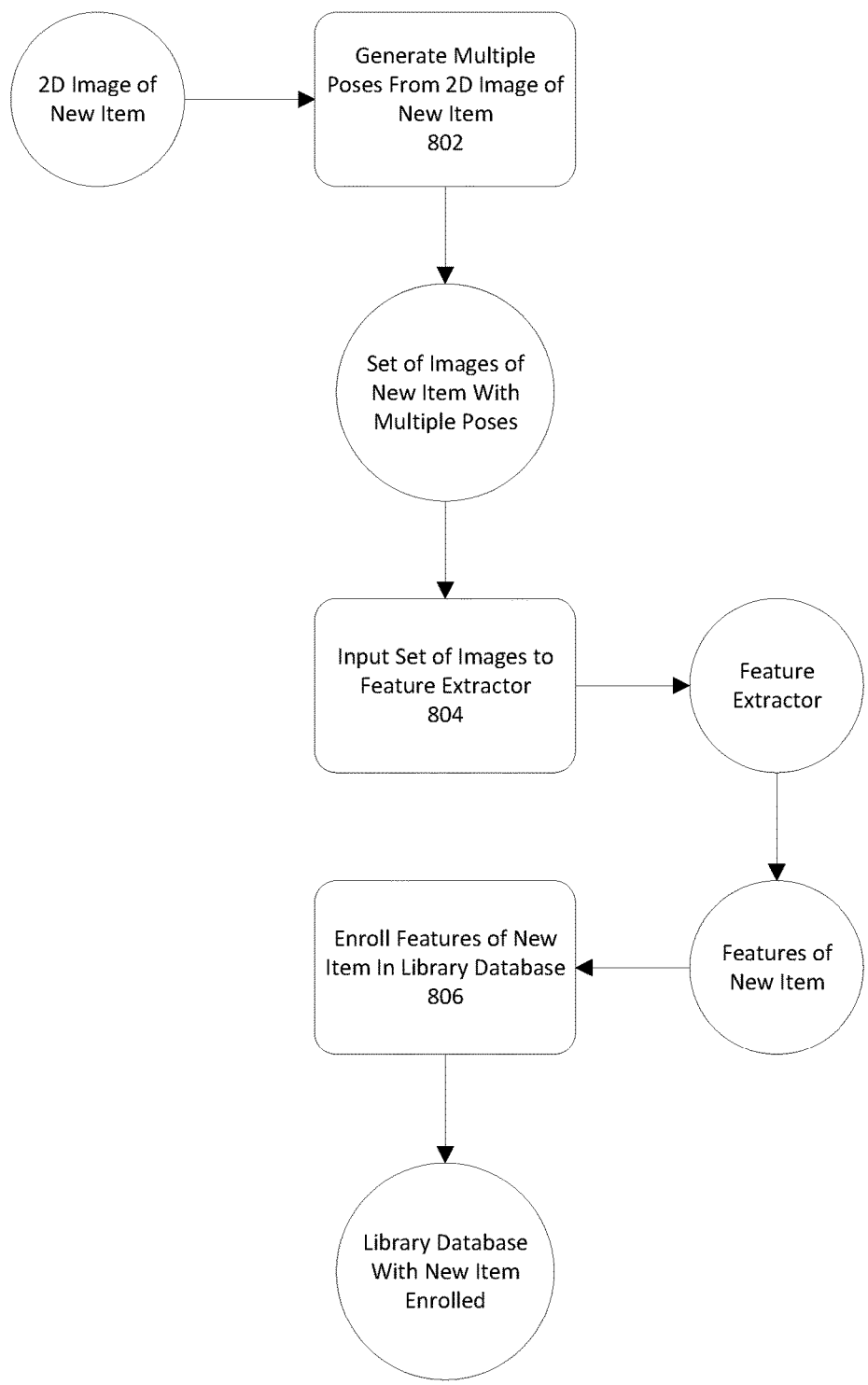
FIG. 8 is a flowchart depicting the process of enrolling a new item in the library database.

FIG. 8 is a flowchart showing the process of enrolling a new product in the library database. A 2D image of the new item is used to generate multiple synthetic, pose-altered images of the new item at step 802, resulting in a set of images of the new item with multiple poses (including the original 2D image of the item). The set of images of the new item is then input to the feature extractor at step 804. The feature extractor extracts features of the images and, at step 806, the features of the images are enrolled in the library database for use in product identification, as described with respect to FIG. 9.

Figure 9:
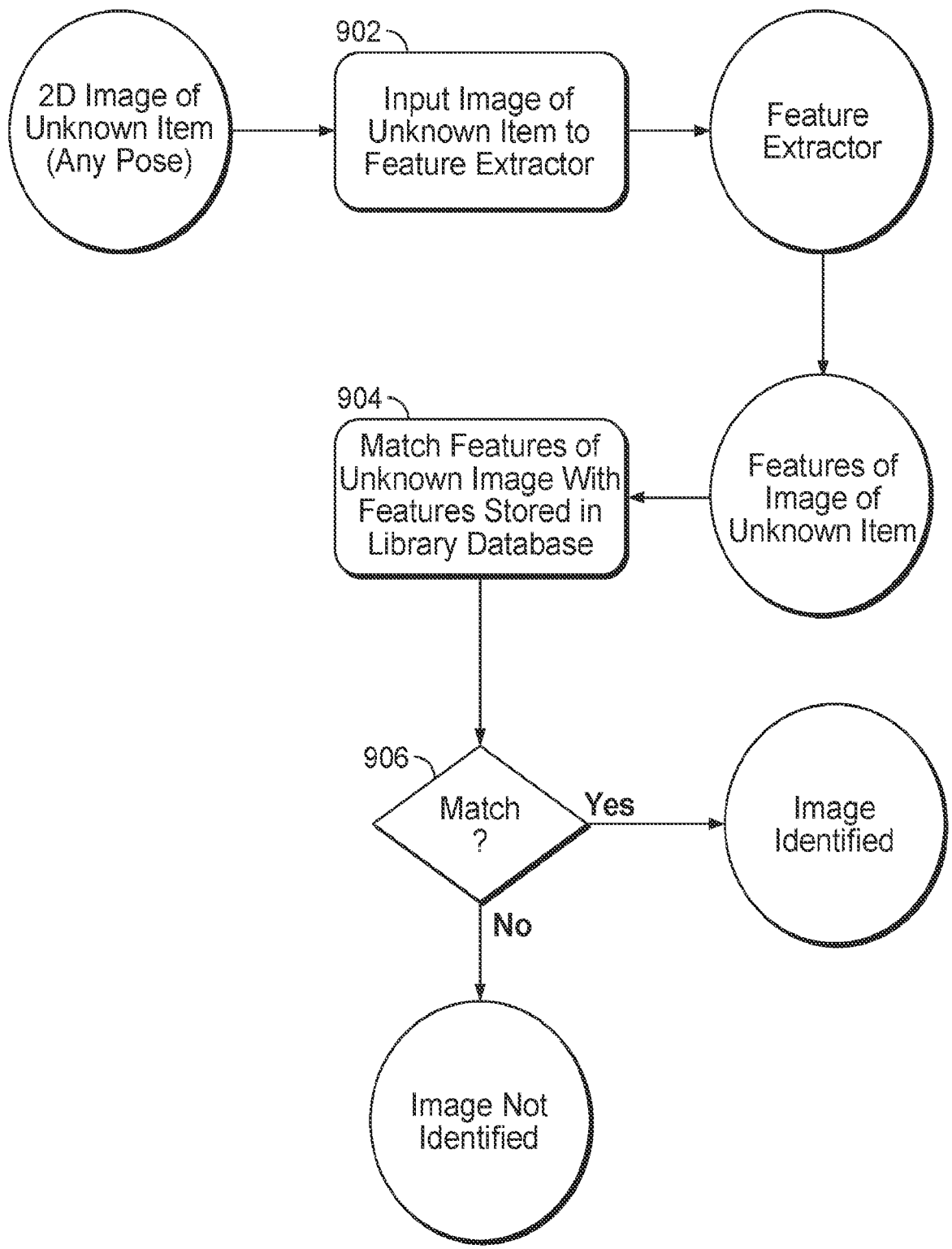
FIG. 9 is a flowchart depicting the process of matching an unknown item with items enrolled in the library database.

FIG. 9 is a process of matching an image of an unknown item with a known image. The 2D image of the unknown item may have any pose. At 902, the image of the unknown item is input to the feature extractor. The feature extractor outputs features of the image of the unknown item and, at step 904, an attempt is made to match the features of the image of the unknown item with features of images of items in the library database, including the pose-altered images of the items in the library database. At 906, if there is a match, the image is positively identified. At 906, if no match is found, the image is not identified. The unidentified image may then optionally be enrolled in the library database by the process shown in FIG. 8. The matching may be performed by a trained classifier.

Figure 10:
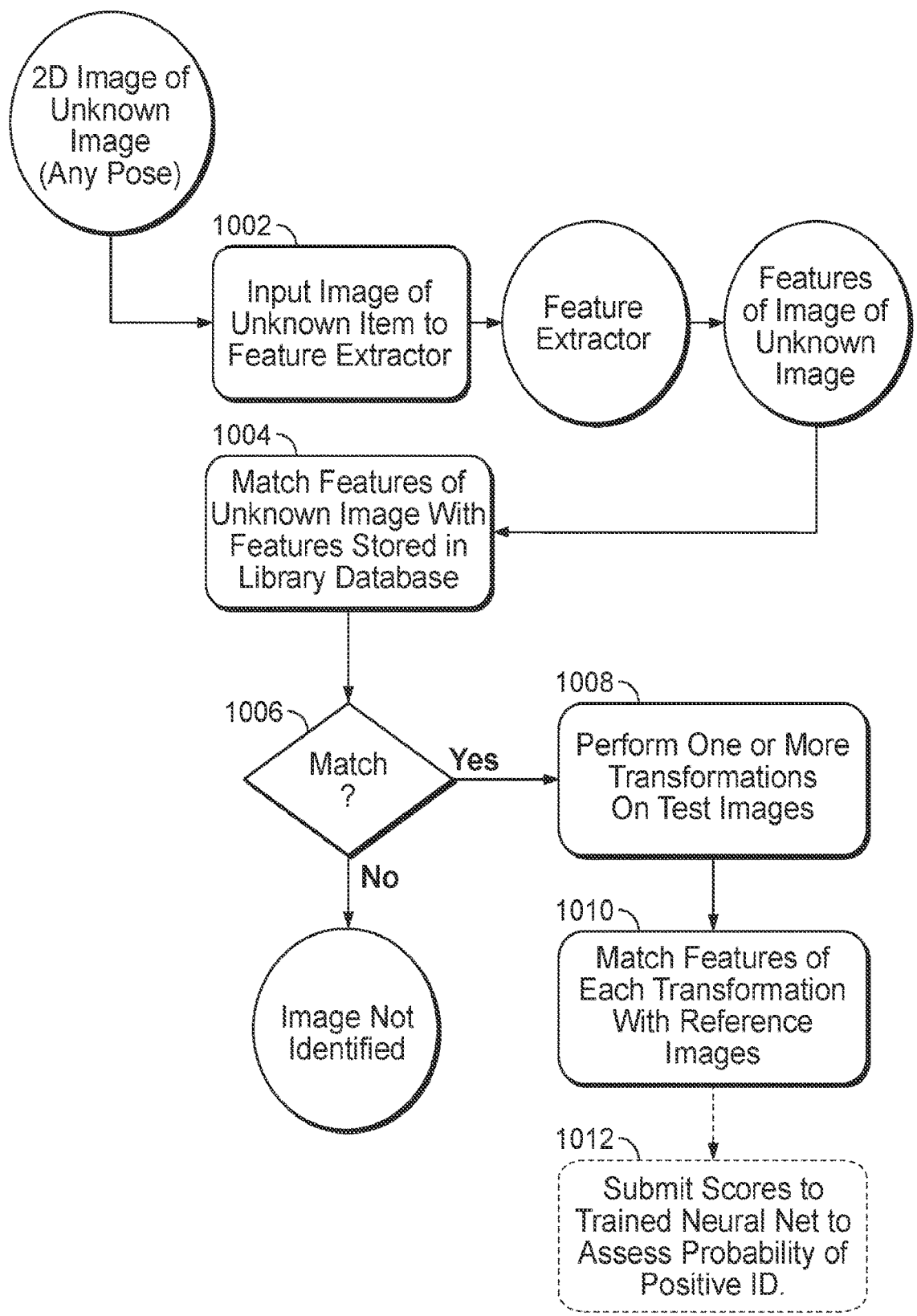
FIG. 10 is a flowchart depicting the process of increasing the confidence in a match between the test image and an image enrolled in the database by performing additional matches on transformations of the test image.

FIG. 10 is a flowchart showing a method for increasing the confidence in a match between a test image and an image in the database. A 2D unknown test image is submitted to the feature extractor at step 1002. The feature extractor, which may be in certain embodiments, the feature extractor trained as described herein, extracts features from the test image. At step 1004, the features from the test image are attempted to be matched with features stored in the library database if, at step 106, match is obtained, at step, 1008, one or more transformations are performed on the test image. The transformations performed on the test image may be one of the transformations described herein to generate pose-altered images, or may be any other type of transformation, for example, a simple rotation or translation. For each of the transformations, an attempt is made to match the features of the transformed image to features in the database representing a transformed image. Preferably, the transform performed on the transferred image in the database will be the same as a transformed performed on the test image. In one embodiment, at step 1012, the scores from the matching of the transformed test images may be submitted to a trained neural net to assess the probability of a positive identification (i.e., match between the test image and an image represented by features in the database. Alternatively, any other method may be used to aggregate the transformed test images to determine an overall confidence in the match between the test image and an image having features stored in the library database.

As would be realized by one of skill in the art, the disclosed method described herein can be implemented by a system comprising a processor and memory, storing software that, when executed by the processor, performs the functions comprising the method.

As would further be realized by one of skill in the art, many variations on implementations discussed herein which fall within the scope of the invention are possible. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:

1. A method comprising:
receiving a test image;
extracting features from the test image;
matching the features extracted from the test image with features stored in a library database;
if a match is obtained, performing one or more transformations on the test image to generate one or more pose-altered images;
extracting features from the one or more pose-altered images; and
matching the features extracted from the one or more pose-altered images with features stored in the library database.

2. The method of claim 1 further comprising:
receiving one or more scores from the matching of features extracted from the one or more pose-altered images; and
submitting the one or more scores to a neural network trained to determine the probability of a match between the test image and an image in the library database, based on the one or more scores.

3. The method of claim 2 wherein the step of transforming the test image comprises:
generating a 3D model of the test image; and
generating pose-altered images showing different viewpoints of the image by rotating the 3D model along one or more axes.

4. The method of claim 2 wherein the step of transforming the test image comprises:
fixing the test image to a plane with a known depth; and
generating pose-altered images showing different viewpoints of the image by rotating the test image along one or more of the axes of the plane.

5. The method of claim 2 wherein the step of transforming the test image comprises:
using planar homography by fitting corner endpoints of the test image to different configurations to simulate pose-altered views of the image.

6. The method of claim 2 wherein the step transforming the test image comprises:
training a machine learning model to generate pose-altered images based on the test image; and
inputting the test image of the item to the machine learning model.

7. The method of claim 2 further comprising:
pose correcting the test image to eliminate portions of the image containing views of sides of an item other than a frontal side.

8. The method of claim 1 further comprising:
receiving one or more scores from the matching of features extracted from the one or more pose-altered images;
aggregating the one or more scores; and
calculating a probability of a match between the test image in an image in the library database based on the aggregated scores.

9. The method of claim 1 wherein the pose-altered images include views modified from the one or more 2D test images, the modifying including presenting items depicted in the image at arbitrary angles, rotating the items, translating the items, crumpling the items, modifying the colors of the items, over-exposing the items and under-exposing the items.

10. The method of claim 1 wherein the matching is performed by a trained classifier.

11. A system comprising:
a processor; and
software that, when excluded by the processor, causes the system to:
receive a test image;
extract features from the test image;
match the features extracted from the test image with features stored in a library database;
if a match is obtained, perform one or more transformations on the test image to generate one or more pose-altered images;
extract features from the one or more pose-altered images; and
match the features extracted from the one or more pose-altered images with features stored in the library database.

12. The system of claim 11 wherein the software further causes the system to:
receive one or more scores from the matching of features extracted from the one or more pose-altered images; and
submit the one or more scores to a neural network trained to determine the probability of a match between the test image and an image in the library database, based on the one or more scores.

13. The system of claim 12, the software further causing the system to:
pose correct the test image to eliminate portions of the image containing views of sides of an item other than a frontal side.

14. The method of claim 11, the software further causing the system to:
receive one or more scores from the matching of features extracted from the one or more pose-altered images;
aggregate the one or more scores; and
calculate a probability of a match between the test image in an image in the library database based on the aggregated scores.

15. The system of claim 11 wherein the pose-altered images include views modified from the one or more 2D test images, the modifying including presenting items depicted in the image at arbitrary angles, rotating the items, translating the items, crumpling the items, modifying the colors of the items, over-exposing the items and under-exposing the items.

16. The system of claim 11 wherein the matching is performed by a trained classifier.

17. The method of claim 11 wherein the software causes the transformation of the test image by causing the system to:
generate a 3D model of the test image; and
generate pose-altered images showing different viewpoints of the image by rotating the 3D model along one or more axes.

18. The system of claim 11 wherein the software causes the transformation of the test image by causing the system to:
fix the test image to a plane with a known depth; and
generate pose-altered images showing different viewpoints of the image by rotating the test image along one or more of the axes of the plane.

19. The system of claim 11 wherein the software causes the transformation of the test image by causing the system to:
  use planar homography by fitting corner endpoints of the test image to different configurations to simulate pose-altered views of the image.

20. The method of claim 11 wherein the software causes the transformation of the test image by causing the system to:
  train a machine learning model to generate pose-altered images based on the test image; and
  input the test image of the item to the machine learning model.

\* \* \* \* \*